United States Patent
Gatherer et al.

(10) Patent No.: US 7,450,672 B2
(45) Date of Patent: Nov. 11, 2008

(54) USING SISO DECODER FEEDBACK TO PRODUCE SYMBOL PROBABILITIES FOR USE IN WIRELESS COMMUNICATIONS THAT UTILIZE SINGLE ENCODER TURBO CODING AND TRANSMIT DIVERSITY

(75) Inventors: Alan Gatherer, Richardson, TX (US); Tarik Muharemovic, Sarajevo (BA); Everest W. Huang, Cambridge, MA (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 190 days.

(21) Appl. No.: 11/246,618

(22) Filed: Oct. 7, 2005

(65) Prior Publication Data

US 2006/0029169 A1    Feb. 9, 2006

Related U.S. Application Data

(62) Division of application No. 10/037,179, filed on Oct. 23, 2001, now Pat. No. 7,120,213.

(60) Provisional application No. 60/244,043, filed on Oct. 27, 2000.

(51) Int. Cl.
*H04B 7/10* (2006.01)
(52) U.S. Cl. ........................................ 375/347
(58) Field of Classification Search ................ 375/347, 375/346, 341, 265; 714/80, 701; 708/277
See application file for complete search history.

(56) References Cited

U.S. PATENT DOCUMENTS

| | | | |
|---|---|---|---|
| 5,883,907 A | 3/1999 | Hoekstra | |
| 6,307,901 B1 | 10/2001 | Yu et al. | |
| 6,671,338 B1 | 12/2003 | Gamal et al. | |
| 6,757,701 B2 | 6/2004 | Sivan et al. | |

(Continued)

FOREIGN PATENT DOCUMENTS

EP    0 982 870 A1    1/2000

(Continued)

OTHER PUBLICATIONS

"Combined Multilevel Turbo-Code With MR-Modulation", L. Papke, et al., Communications—Gateway to Globalization. Proceedings of the Conference on Communications. Seattle, Jun. 18-22, 1995, Proceedings of the Conference on Communications (ICC), New York, IEEE, US, vol. 2, Jun. 18, 1995, 668-672, XP000533098, ISBN: 9-7803-2487-0.

(Continued)

*Primary Examiner*—Khai Tran
(74) *Attorney, Agent, or Firm*—Ronald O. Neerings; Wade James Brady, III; Frederick J. Telecky, Jr.

(57) ABSTRACT

An apparatus and method for transmitting and receiving a bit stream. On the transmission side, coded bits (Y.sub.t) and an interleaved version of the coded bits (X.sub.t) are separately modulated and transmitted. On the reception side, a priori output probabilities produced by a probability generator (34) are combined (112) and then input to a SISO decoder (111). Combined a posteriori output probabilities (115) produced by the SISO decoder are split (113) and then fed back to the probability generator.

23 Claims, 5 Drawing Sheets

U.S. PATENT DOCUMENTS

| | | | |
|---|---|---|---|
| 6,763,494 | B2 | 7/2004 | Hewitt |
| 6,789,218 | B1 | 9/2004 | Edmonston et al. |
| 6,891,897 | B1 | 5/2005 | Bevan et al. |
| 2001/0004390 | A1* | 6/2001 | Pukkila et al. ............... 375/340 |
| 2002/0015419 | A1* | 2/2002 | Kim et al. ................... 370/468 |
| 2002/0041646 | A1 | 4/2002 | Huang et al. |
| 2002/0110206 | A1 | 8/2002 | Becker et al. |

FOREIGN PATENT DOCUMENTS

| | | |
|---|---|---|
| WO | WO 98/43373 A | 1/1998 |

OTHER PUBLICATIONS

"Improved Space-Time Codes Using Serial Concatenation", Xiaotong Lin, et al., IEEE Communications Letters, IEEE Service Center, Piscataway, NJ, US, vol. 4, No. 7, Jul. 20000, pp. 221-223, XP000958655, ISSN: 1089-7798.

Y. Liu, M.P. Fitz, and O.Y. Takeshita, "Qpsk Space-Time Turbo Codes", in *IEEE ICC*, Jun. 2000.

X. Li and J.A. Ritcey, "Bit-interleaved Coded Modulation With Iterative Decoding Using Soft Feedback", *Electronic Letters*, vol. 34, pp. 942-943, Apr. 3, 1998.

X. Li and J.A. Ritcey, "Bit Interleaved Coded Modulation With Iterative Decoding", in *IEEE ICC*, vol. 2, pp. 858-863, Jun. 1999.

X. Li and J.A. Ritcey, "Trellis-Coded Modulation With Bit Interleaving And Iterative Decoding", *IEEE Journal on Selected Areas in Communications*, vol. 17, pp. 715-724, Apr. 1999.

X. Li and J.A. Ritcey, "Bit-Interleaved Coded Modulation with Iterative Decoding", *IEEE Communication Letters*, vol. 1, pp. 169-171, Nov. 1997.

V. Tarokh, N. Seshadri, and A.R. Calderbank, "Space-Time Codes for High Data Rate Wireless Communication: Performance Criterion and Code Construction", in *IEEE Transactions on Information Theory*, vol. 44, No. 2, pp. 744-765, Mar. 1998.

A.R. Hammons and H.E. Gamal, "On the Theory of Space-Time Codes for PSK Modulation", in *IEEE Transactions on Information Theory*, vol. 2, No. 2, pp. 524-542, Mar. 2000.

S. Benedetto, "A Soft-Input Soft-Output App Module for Iterative Decoding of Concatenated Codes", *IEEE Communications Letters*, vol. 1, No. 1, Jan. 1997.

* cited by examiner

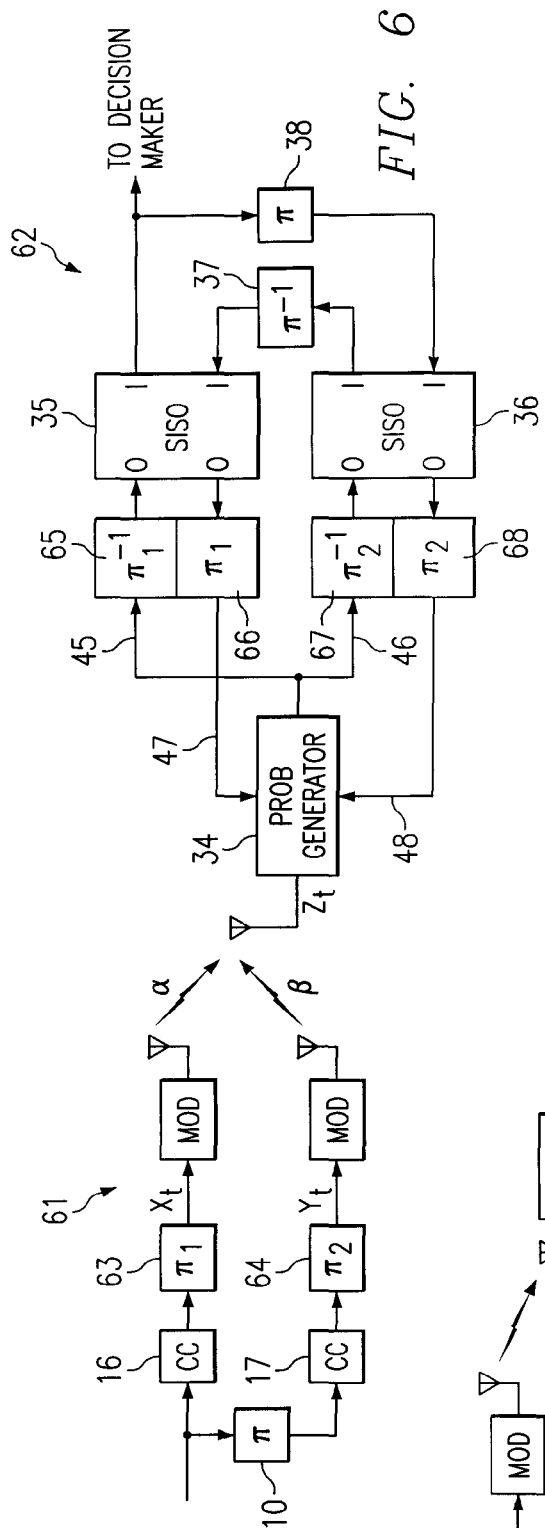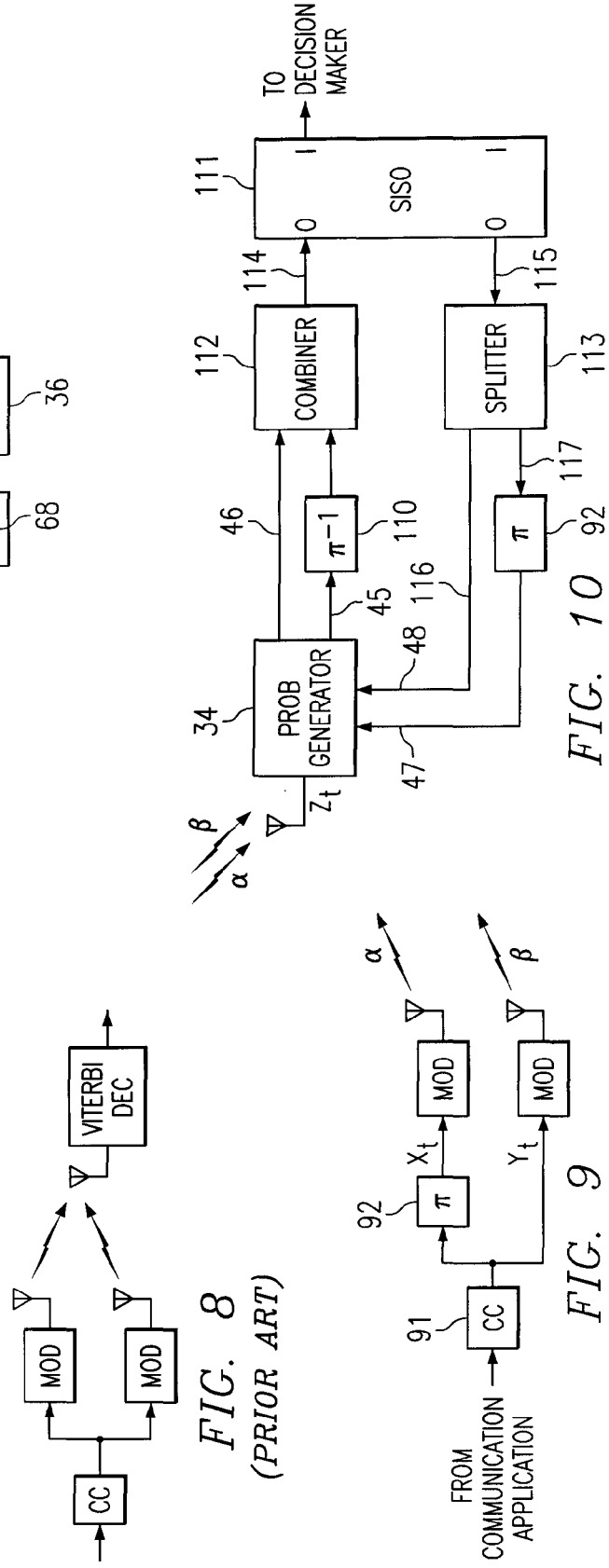

USING SISO DECODER FEEDBACK TO PRODUCE SYMBOL PROBABILITIES FOR USE IN WIRELESS COMMUNICATIONS THAT UTILIZE SINGLE ENCODER TURBO CODING AND TRANSMIT DIVERSITY

This application is a Divisional of application Ser. No. 10/037,179, filed Oct. 23, 2001, now U.S. Pat. No. 7,120,213 which claims priority under 35 USC 119(e)(1) of copending U.S. provisional application No. 60/244,043 filed on Oct. 27, 2000. This application contains subject matter related to subject matter disclosed in U.S. Ser. No. 09/925,077 filed on Aug. 8, 2001, which is incorporated herein by reference.

FIELD OF THE INVENTION

The invention relates generally to wireless communications and, more particularly, to wireless communications that utilize turbo coding and transmit diversity.

BACKGROUND OF THE INVENTION

Each of the documents listed below is referred to herein by the corresponding number enclosed in square brackets to the left of the document. Each of these documents is also incorporated herein by reference.

[1] Y. Liu, M. P. Fitz, and O. Y. Takeshita, "Qpsk space-time turbo codes," in IEEE ICC, June 2000.
[2] X. Li and J. A. Ritcey, "Bit-interleaved coded modulation with iterative decoding," using soft feedback, *Electronic Letters*, vol. 34, pp. 942-943, 4 Mar. 1998.
[3] X. Li and J. A. Ritcey, "Bit-interleaved coded modulation with iterative decoding," in *IEEE ICC*, vol. 2, pp. 858-863, June 1999.
[4] X. Li and J. A. Ritcey, "Trellis-coded modulation with bit interleaving and iterative decoding," *IEEE Journal on Selected Areas in Communications*, vol. 17, pp. 715-724, April 1999.
[5] X. Li and J. A. Ritcey, "Bit-interleaved coded modulation with iterative decoding," *IEEE Communications Letters*, vol. 1, pp. 169-171, November 1997.
[6] V. Tarokh, N. Seshadri, and A. R. Calderbank, "Space-Time Codes for High Data Rate Wireless Communication: Performance Criterion and Code Construction," in *IEEE Transactions on information theory*, vol. 44, No. 2, pp. 744-765, March 1998.
[7] A. R. Hammons and H. E. Gamal, "On the Theory of Space-Time Codes for PSK Modulation," in *IEEE Transactions on information theory*, vol. 2, No. 2, pp. 524-542, March 2000.

Coding and interleaving techniques are often used in wireless communication systems to improve the communication performance. FIG. 1 illustrates an example of a conventional wireless communication system described in [1]. This example implements turbo coding by using two convolutional coders (CC). One of the convolutional coders receives at its input the data stream that is to be transmitted, and the other convolutional coder receives at its input an interleaved (see 10) version of the data stream. The outputs of the convolutional coders are then modulated using QPSK (Quadrature Phase Shift Keying) and transmitted by respective transmit antennas. At the receiver, the signal from the antenna is input to a probability generator which generates symbol (or bit) probabilities. These symbol probabilities are fed to soft-input, soft-output (SISO) decoders that iterate to get estimates of the transmitted symbols (or bits). The SISO decoders use knowledge of the trellis of the convolutional coders to produce the estimates.

FIG. 2 illustrates an example of a conventional wireless communication system described in [2] and [3]. The system of FIG. 2 uses a single convolutional coder and an interleaver 21 before modulation and transmission by a single antenna. At the receiver, the signal from the antenna is demodulated and de-interleaved (see 22), and is then input to a SISO decoder. The a posteriori symbol probabilities output from the SISO decoder are interleaved (see 23) and fed back into the demodulator to get a better estimate of the symbol probabilities. This loop is iterated over. Systems similar to the one illustrated in FIG. 2 have also been suggested in [4] and [5], but those systems implement hard decoding decisions instead of soft decisions.

FIG. 8 illustrates an example of a conventional wireless communication system described in [6]. In this example, bits are encoded with a single encoder, and separate sets of the encoded bits are applied to respective modulators in separate branches. The modulators perform constellation mapping, and the separate branches permit transmit diversity. Special care is exercised in order to provide a full diversity stream. At the receiving end, conventional Viterbi decoding is performed. The work in [6] was followed by the work in [7], wherein it is demonstrated that, for all BPSK constellations, it is very easy to achieve diversity, and that coding advantage should be a primary optimization goal.

It is desirable in view of the foregoing to provide for improved performance in wireless communication systems that utilize turbo coding and transmit diversity.

According to the invention, coded bits and an interleaved version of the coded bits are separately modulated and transmitted. On the receiver side, a priori output probabilities produced by the probability generator are combined and then input to a SISO decoder, and combined a posteriori output probabilities produced by the SISO decoder are split and then fed back to the probability generator. This advantageously permits the probability generator to produce an improved estimate of the received symbols.

BRIEF DESCRIPTION OF THE DRAWINGS

FIG. 6 diagrammatically illustrates further exemplary embodiments of wireless communication systems which utilize interleaving, turbo coding, transmit diversity and a posteriori probability feedback according to the invention.

FIG. 8 illustrates a conventional wireless communication system which utilizes a single encoder and transmit diversity.

FIG. 9 diagrammatically illustrates exemplary embodiments of a wireless communication transmission apparatus which utilizes a single encoder according to the invention.

FIG. 10 diagrammatically illustrates exemplary embodiments of a wireless communication receiving apparatus that is cooperable with the wireless communication transmission apparatus of FIG. 9.

DETAILED DESCRIPTION

Figure 1:
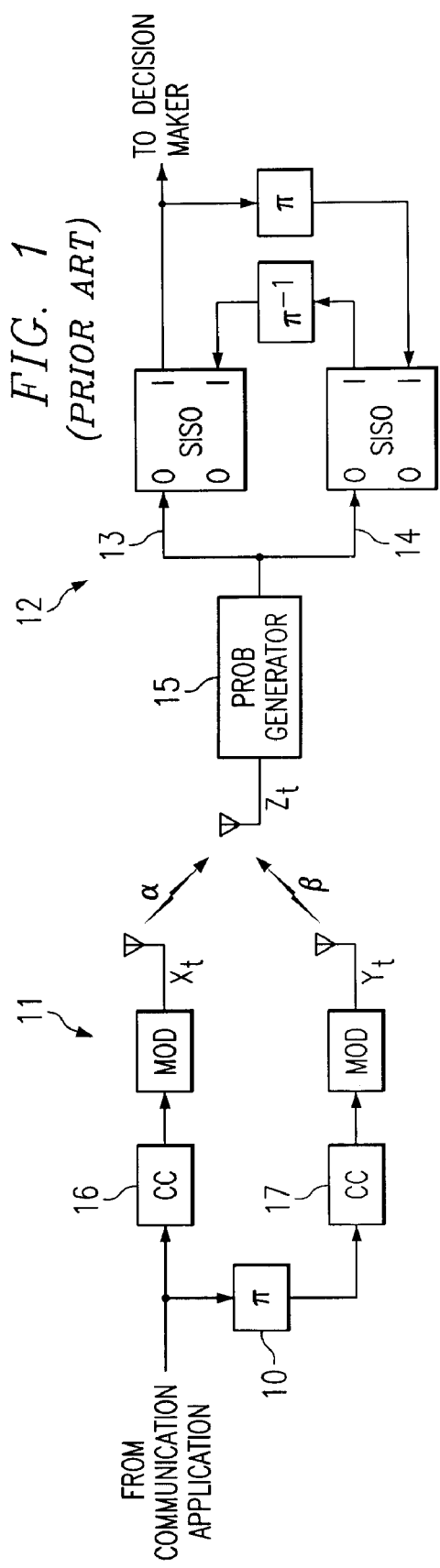
FIG. 1 illustrates a conventional wireless communication system which utilizes interleaving, turbo coding and transmit diversity.
Figure 2:
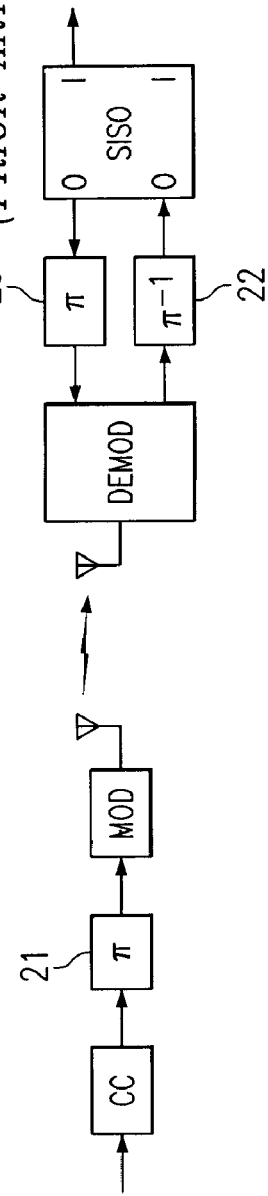
FIG. 2 illustrates a conventional wireless communication system that utilizes turbo coding, interleaving and feedback of a posteriori probabilities from a SISO decoder.

Referring again to FIG. 1, the symbol $Z_t$ received by the antenna of the receiver 12 at time t can be expressed as a function of the corresponding symbols or bits $X_t$ and $Y_t$ produced by the respective convolutional coders of the transmitter 11, and the fading characteristics of the respective wireless communication channels through which $X_t$ and $Y_t$ are transmitted to the receiver 12. The fading characteristics (or coefficients) are illustrated by fading parameters $\alpha$ and $\beta$ in FIG. 1. Accordingly, the symbol value received by the antenna of the receiver 12 can be expressed as follows $$Z_t = \alpha X_t + \beta Y_t + n_t, \quad (1)$$

where $n_t$ represents noise in the wireless communication channels. At 13, the probability generator 15 produces, for all possible values $C_X$ that $X_t$ can assume at time t, the following probability $$P(X_t = C_X | Z_t = C_Z) \quad (2)$$

Expression (2) above represents the probability that $X_t = C_X$ given that the received symbol or bit value $Z_t = C_Z$. At 14, the probability generator 15 produces similar probabilities for all possible values $C_y$ of $Y_t$, namely $$P(Y_t = C_Y | Z_t = C_Z) \quad (3)$$

Taking the probability defined in Expression (2) above as an example, and applying Bayes' Rule, Expression (2) can be written as follows $$P(Z_t = C_Z | X_t = C_X) P(X_t = C_X) / P(Z_t = C_Z) \quad (4)$$

In practice, for an iterative loop, the probability given by Expression (2) is generated under the assumption that nothing is known in advance about the statistics of $X_t$. This is called the extrinsic probability and ensures that only "new" information is used to generate data that will be fed back. Therefore, $P(X_t = C_X)$ can be eliminated from Expression (4). The denominator of Expression (4) can also be eliminated because it merely represents the probability that $Z_t = C_Z$ at time t, which is merely a constant value that operates only as a scaling factor. Thus, eliminating the aforementioned extrinsic factor and the aforementioned scaling factor from Expression (4) leaves $$P(Z_t = C_Z | X_t = C_X) \quad (5)$$

Using known probability theory, Expression (5) can be rewritten as follows $$\sum_{C_Y} P(Z_t = C_Z | X_t = C_X \text{ and } Y_t = C_Y) P(Y_t = C_Y | X_t = C_X) \quad (6)$$

Referring again to Equation (1) above, the leftmost probability of Expression (6) can be rewritten as follows $$P(n_t = C_Z - \alpha C_X - \beta C_Y) \quad (7)$$

Substituting Expression (7) into Expression (6) gives $$\sum_{C_Y} P(n_t = C_Z - \alpha C_X - \beta C_Y) P(Y_t = C_Y | X_t = C_X) \quad (8)$$

Thus, Expression (2) above can be rewritten as Expression (8) above.

The noise $n_t$ in Expression 8 can be modeled as a Gaussian random variable, and the fading parameters $\alpha$ and $\beta$ can be readily estimated. Thus, given that the received symbol $Z_t = C_Z$ is known, values of the leftmost probability in Expression 8 can be easily calculated for all possible values of $C_X$ and $C_Y$. The values of the rightmost probability of Expression (8) are provided according to the invention as the a posteriori output probabilities from a SISO decoder, as described in more detail below.

Using reasoning analogous to that given above for rewriting Expression (2) as Expression (8), Expression (3) above can be rewritten as follows $$\sum_{C_X} P(n_t = C_Z - \alpha C_X - \beta C_Y) P(X_t = C_X | Y_t = C_Y) \quad (9)$$

As mentioned above with respect to Expression (8), the leftmost probability of Expression (9) can be easily calculated for a known value of $C_Z$ and all possible values of $C_X$ and $C_Y$. Also analogous to the discussion of Expression (8) above, the values of the rightmost probability of Expression (9) are provided according to the invention as a posteriori output probabilities of a SISO decoder.

Figure 3:
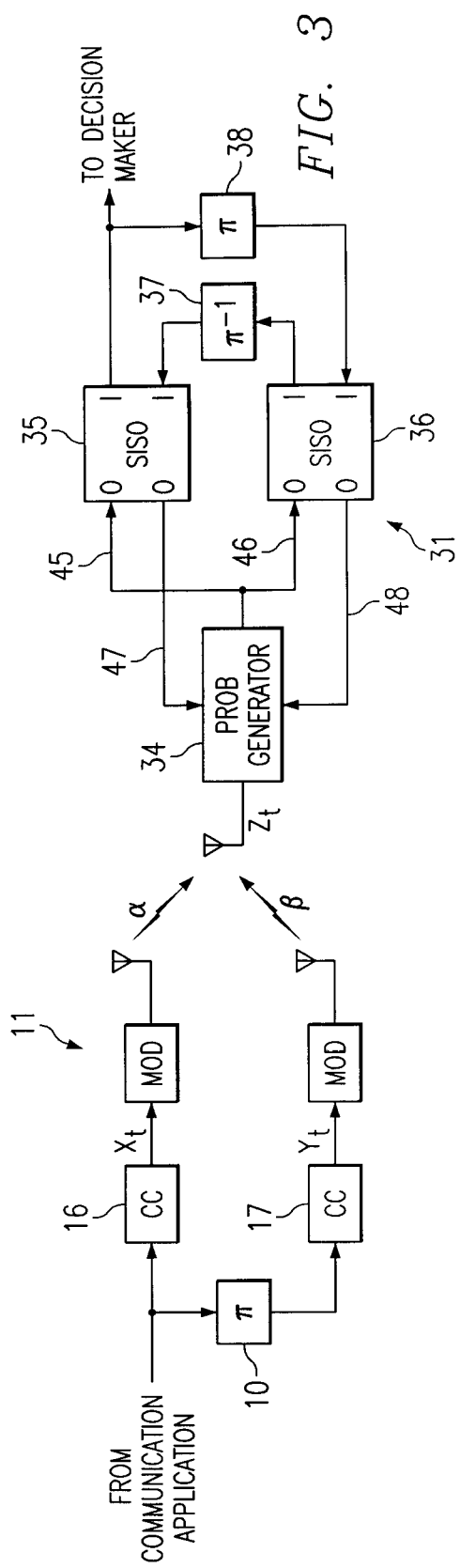
FIG. 3 diagrammatically illustrates exemplary embodiments of wireless communication systems which utilize turbo coding, interleaving, transmit diversity and a posteriori probability feedback according to the invention.

Referring now to FIG. 3, in exemplary wireless communication system embodiments according to the invention, a receiver 31 includes a probability generator 34 coupled to an antenna which receives symbol $Z_t$ from a transmitter that employs transmit diversity, for example the transmitter 11 of FIG. 1. The probability generator 34 calculates the values of the leftmost probability in Expressions (8) and (9). At its input 47, the probability generator receives (as feedback) from SISO decoder 35 the values of the rightmost probability of Expression (9). At its input 48, the probability generator 34 receives (as feedback) from the SISO decoder 36 the values of the rightmost probability of Expression (8). Having calculated the values of the leftmost probability of Expressions (8) and (9), and having received the values of the rightmost probabilities of Expressions (8) and (9) from the SISO decoders 36 and 35, respectively, the probability generator 34 performs the summation of Expression (8) to produce at its output 45 the values of the probability of Expression (2), and also performs the summation of Expression (9) to produce at its output 46 the values of the probability of Expression (3).

The outputs 45 and 46 provide a priori output probabilities to the SISO decoders 35 and 36. The decoder 35 operates with respect to $X_t$ and the decoder 36 operates with respect to $Y_t$. The SISO decoders 35 and 36 use their respective a priori output probabilities to produce respective a posteriori input probabilities. The a posteriori input probabilities produced by SISO decoder 35 are interleaved at 38 (corresponding to the interleaver in the transmitter 11) and the results are provided as a priori input probabilities to the SISO decoder 36. Similarly, the a posteriori input probabilities produced by the SISO decoder 36 are de-interleaved at 37 (again corresponding to the interleaver of the transmitter 11) and the results are provided as a priori input probabilities to the SISO decoder 35. The a posteriori input probabilities produced by the SISO decoder 35 are also provided to a decision maker which can use conventional techniques to decide the input symbol (as seen by the corresponding coder 16) based on the a posteriori input probabilities.

The output probabilities provided to (a priori) and produced by (a posteriori) the SISO decoder 35 represent respective probabilities that the symbol $X_t$ as output from the convolutional coder 16 has respective ones of a plurality of possible values. Similarly, the input probabilities provided to (a priori) and produced by (a posteriori) SISO decoder 35 represent respective probabilities that the symbol that was input to the convolutional coder 16 to produce $X_t$ has respective ones of a plurality of possible values. The SISO decoder 36 functions analogously with respect to the symbol $Y_t$ and the convolutional coder 17. Each SISO decoder uses the a priori probabilities (input and output) provided thereto together with knowledge of the trellis used by the corresponding convolutional coder to produce corresponding a posteriori probabilities (output and input). In some embodiments, each coder 16 and 17 uses the same trellis.

Figure 4:
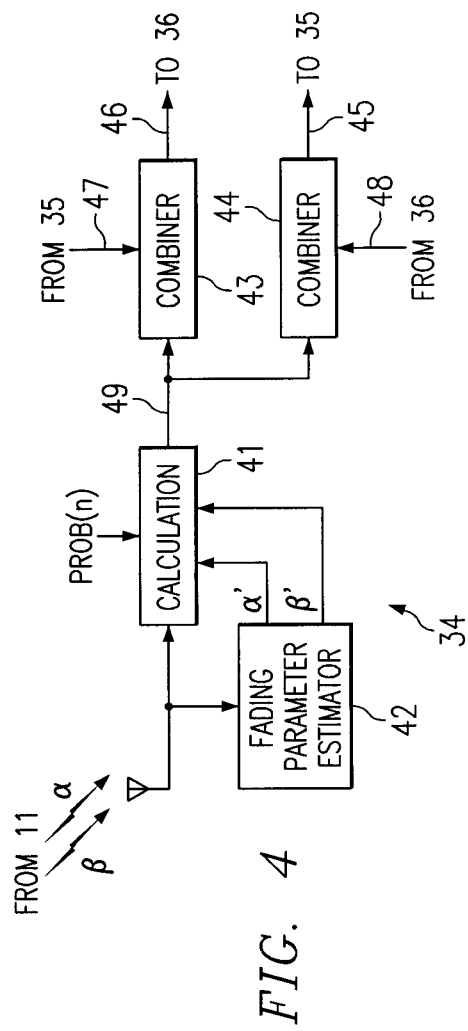
FIG. 4 diagrammatically illustrates exemplary embodiments of the probability generator of FIG. 3.

FIG. 4 diagrammatically illustrates exemplary embodiments of the probability generator 34 of FIG. 3. A fading parameter estimator 42 provides estimates α' and β' of the fading parameters α and β of FIG. 3 using, for example, any desired conventional technique. A calculation apparatus 41 receives these estimated fading parameters, and also has access (e.g. from look-up table values) to the probability of the noise parameter $n_t$, which can be modeled, for example, as a Gaussian random variable. The calculation apparatus 41 knows the value of $C_Z$ (simply the received value) in Expressions (8) and (9), and thus can calculate the values of the leftmost probability in Expressions (8) and (9) using the estimated fading parameters α' and β'. Thus, the calculation apparatus 41 produces at 49 the values of the leftmost probability of Expressions (8) and (9). These values are input to combiners 43 and 44.

The combiner 43 receives at 47 the a posteriori output probabilities produced by SISO decoder 35, and the combiner 44 receives at 48 the a posteriori output probabilities produced by SISO decoder 36. The values received at 47 represent the values of the rightmost probability in Expression (9) and the values received at 48 represent the values of the rightmost probability in Expression (8). The combiner 43 operates to combine the values that it receives at 49 and 47 in the manner shown in Expression (8), namely multiplying the values together and summing the resulting products over all possible values of $C_Y$. Similarly, the combiner 44 combines the values that it receives at 49 and 48 as shown by Expression (9) above, namely multiplying the values together and summing the resulting products over all possible values of $C_X$. The combiner 43 produces at 46 the values of the probability shown in Expression (3), and the combiner 44 produces at 45 the values of the probability shown in Expression (2).

It should be clear that the probability generator 34 can easily account for the scaling factor described above with respect to Expression (4) by suitably normalizing the probability values that it generates, although such normalizing is not explicitly shown in the drawings.

Figure 5:
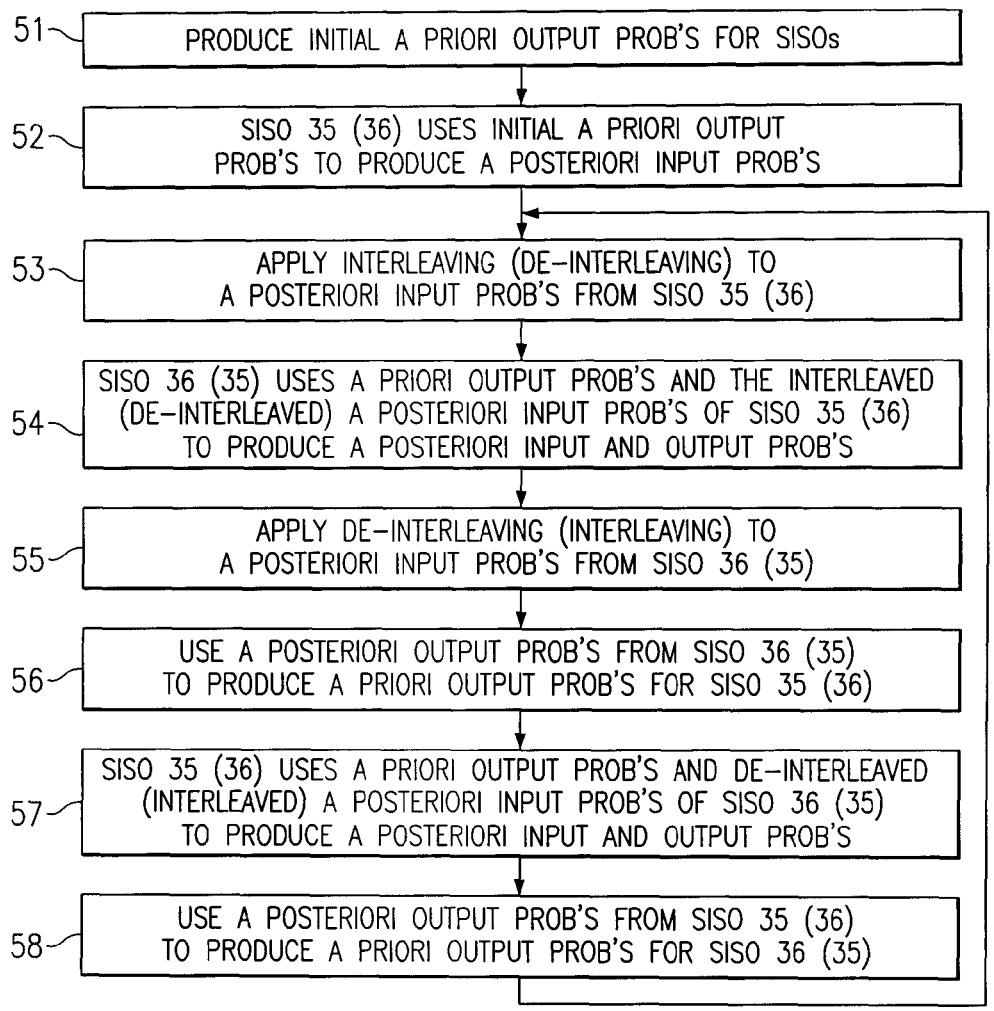
FIG. 5 illustrates exemplary operations which can be performed by the receiver of FIG. 3.

FIG. 5 illustrates exemplary operations which can be performed by the receiver embodiments of FIGS. 3 and 4. At 51, initial a priori output probabilities are produced for the SISO decoders. This can be done, for example, by the probability generator 34 calculating the values of the leftmost probabilities of Expressions (8) and (9) and summing these values without multiplying by the rightmost probabilities of Expressions (8) and (9) (which rightmost probabilities are not yet available as feedback from the SISOs). FIG. 5 assumes that the SISO decoder 35 is selected to operate first and begin the iterative process. However, the SISO 36 could also be selected to operate first and begin the iterative process, and this possibility is therefore indicated by the parenthetical expressions in FIG. 5. The following textual description of FIG. 5 assumes the aforementioned example of beginning with SISO 35.

At 52, SISO 35 uses the initial a priori output probabilities to produce a posteriori input probabilities. At 53, interleaving is applied to the a posteriori input probabilities from SISO 35. At 54, SISO 36 uses the initial (for the first iteration) a priori output probabilities and the interleaved a posteriori input probabilities of SISO 35 to produce a posteriori input and output probabilities. At 55, de-interleaving is applied to the a posteriori input probabilities from SISO 36. At 56, the a posteriori output probabilities from SISO 36 are used to produce a priori output probabilities for SISO 35. At 57, the SISO 35 uses its a priori output probabilities and the de-interleaved a posteriori input probabilities of SISO 36 to produce a posteriori input and output probabilities. At 58, the a posteriori output probabilities from SISO 35 are used to produced a priori output probabilities for SISO 36. The operations at 53-58 are then repeated for any desired number of iterations.

FIG. 6 diagrammatically illustrates further exemplary embodiments of a wireless communication system according to the invention. In the system of FIG. 6, the transmitter 61 is similar to the transmitter 11 of FIGS. 1 and 3, but includes interleavers 63 and 64 at the outputs of the convolutional coders. Thus, the receiver 62 includes a de-interleaver 65 and an interleaver 66 to account for the operations of the interleaver 63, and also includes a de-interleaver 67 and an interleaver 68 to account for the operation of the interleaver 64. Aside from the operations of the interleavers and de-interleavers illustrated at 63-68, the wireless communication system of FIG. 6 can operate in generally the same fashion as the wireless communication system of FIG. 3, that is, generally as described above with respect to FIG. 5.

Figure 7:
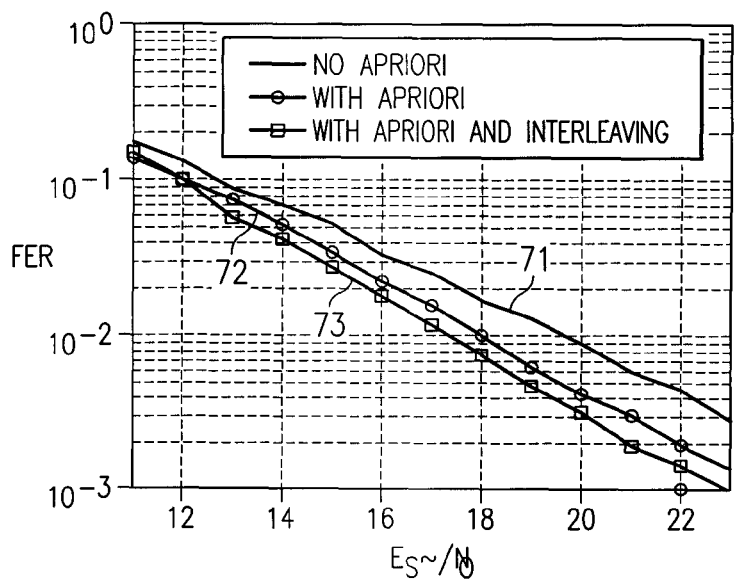
FIG. 7 illustrates exemplary simulation results for the systems of FIGS. 1, 3 and 6.

FIG. 7 illustrates exemplary simulation results for the systems of FIG. 1 (71), FIG. 3 (72), and FIG. 6 (73). As shown in FIG. 7, the FIG. 3 system at 72 performs better (in terms of frame error rate FER) than the FIG. 1 system at 71, showing gains of about 2 dB at higher SNRs. The FIG. 3 system also exhibits a noticeable increase in slope, so the gains can be expected to be even larger at higher SNRs. The FIG. 6 system at 73 provides an additional performance gain of about 1 dB at the higher SNRs, and also exhibits an increase in slope as compared to the system of FIG. 1 at 71.

FIG. 9 diagrammatically illustrates pertinent portions of exemplary embodiments of a wireless communication transmitter apparatus according to the invention. As shown in FIG. 9, the input bits received from a communication application are encoded by a single convolutional coder 91, and the encoded bits are interleaved by an interleaver 92. The symbols or bits $X_t$ produced by the interleaver 92 and the symbols or bits $Y_t$ produced by the encoder 91 are then modulated (for example using QPSK) and transmitted by respective transmit antennas.

FIG. 10 diagrammatically illustrates pertinent portions of exemplary embodiments of a wireless communication receiver apparatus that is capable of receiving the wireless communication signals transmitted by the wireless communication transmitter apparatus of FIG. 9. The apparatus of FIG. 10 includes a probability generator 34 which can be, for example, identical to the probability generator 34 described above with respect to FIGS. 3-6. The a priori output probability values produced at 45 by the probability generator 34 are applied to a de-interleaver 110 to account for the interleaver 92 in the transmitter apparatus of FIG. 9. The a priori output probability values produced at 46 by the probability generator 34 are applied to a combiner 112 along with the output of the de-interleaver 110.

The combiner 112 is operable for combining the probability values at 46 with the probability values output by the de-interleaver 110. In some exemplary embodiments, the combiner is simply a multiplier which multiplies the input probability values by one another. The combiner 112 thus outputs combined a priori output probability values which represent combinations of the a priori output probability values input to the combiner 112. The combined a priori output probability values at 114 are provided to a SISO decoder 111. The SISO decoder 111 uses the combined a priori output probability values 114 to produce combined a posteriori input and output probabilities. The combined a posteriori input probabilities are provided to a decision maker which decides the symbol values, and the combined a posteriori output probabilities are provided at 115 to a splitter 113.

The splitter 113 is operable for splitting each of the combined a posteriori output probability values at 115 into its constituent probability values. The splitter output values 116, corresponding to probability values 46, are provided to input 48 of the probability generator 34, and the splitter output values 117, corresponding to the probability values at 45, are applied to an interleaver 92 (same as in FIG. 9) whose output is provided to the input 47 of the probability generator 34. In some exemplary embodiments, the splitter 113 is a marginal probability calculator which uses conventional techniques to extract, from the combined probability values at 115, constituent marginal probability values corresponding to the probability values at 45 and 46.

The decision maker can also utilize, for example, a splitter such as shown at 113 to split each of the combined a posteriori input probabilities into its constituent probability values. These constituent probability values can then be used in conventional fashion to make the symbol decisions.

Figure 11:
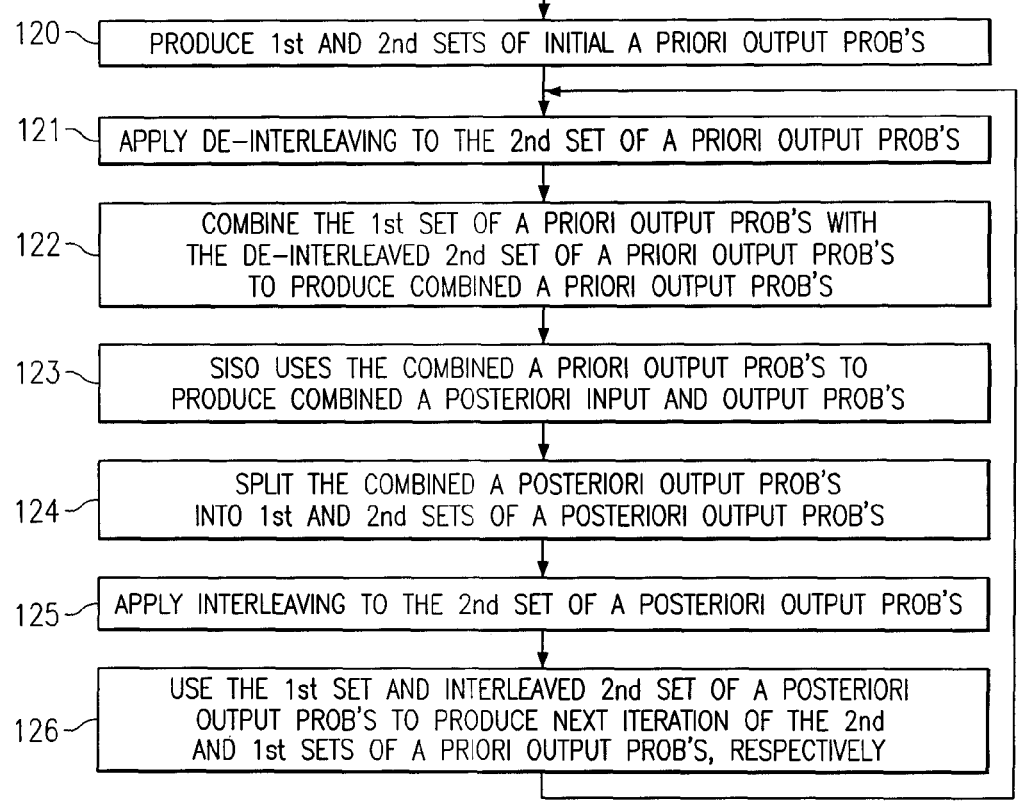
FIG. 11 illustrates exemplary operations which can be performed by the wireless communication receiving apparatus of FIG. 10.

FIG. 11 illustrates exemplary operations which can be performed by the wireless communication receiver apparatus of FIG. 10. At 120, the probability generator 34 produces first and second sets of initial a priori output probabilities. At 121, de-interleaving is applied to the second set of a priori output probabilities. At 122, the first set of a priori output probabilities is combined with the de-interleaved second set of a priori output probabilities to produce combined a priori output probabilities. At 123, the SISO decoder uses the combined a priori output probabilities to produce combined a posteriori input and output probabilities. At 124, the combined a posteriori output probabilities are split into first and second sets of a posteriori output probabilities. At 125, interleaving is applied to the second set of a posteriori output probabilities and, at 126, the first set and the interleaved second set of a posteriori output probabilities are used by the probability generator 34 to produce the next iteration of the second and first sets of a priori output probabilities, respectively. Thereafter, the operations at 121-126 are repeated for any desired number of iterations.

Figure 12:
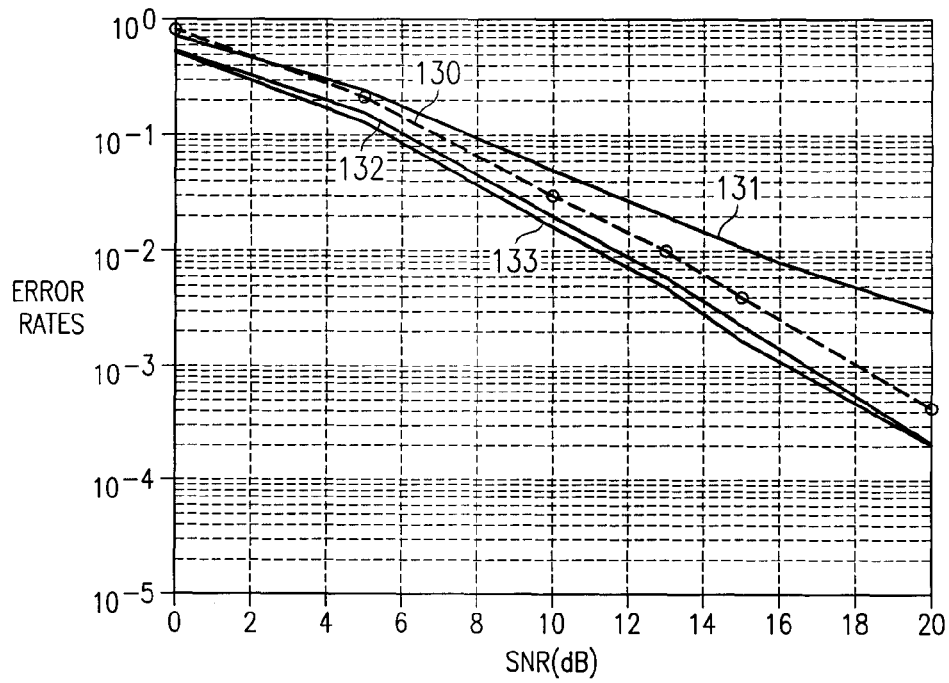
FIG. 12 illustrates exemplary simulation results which compare the performance of the system of FIGS. 9 and 10 to the performance of the conventional system of FIG. 8.

FIG. 12 illustrates simulation results which compare the performance of the conventional system of FIG. 8 with the performance of the system of FIGS. 9-11 according to the invention. In particular, the performance of the conventional system of FIG. 8 is illustrated at 130 and the performance of the system of FIGS. 9-11 is illustrated at 131 (first iteration), 132 (second iteration) and 133 (fifth iteration). The performance illustrated at 131, 132 and 133 was obtained using random interleaving in the transmitter of FIG. 9 and the receiver of FIG. 10.

It will be apparent to workers in the art that any wireless communication system that utilizes a space-time turbo code, or any kind of turbo code, can benefit from the present invention. Advantageously, the added complexity of the a posteriori output probability feedback loops is relatively small compared to the complexity of a SISO block. It will also be apparent to workers in the art that the embodiments of FIGS. 3-6 and 9-11 can be implemented, for example, by suitable modifications in hardware, software, or a combination of hardware and software, in conventional wireless communication transmitters and receivers.

Although exemplary embodiments of the invention are described above in detail, this does not limit the scope of the invention, which can be practiced in a variety of embodiments.

What is claimed is:

1. A wireless communication receiving apparatus, comprising:
    an antenna for receiving via first and second wireless communication channels a composite communication symbol that represents first and second communication symbols which each correspond to a result of a coding operation performed by a transmitter apparatus on a bit stream;
    a probability generator coupled to said antenna and responsive to said composite communication symbol for generating, for said first and second communication symbols, corresponding first and second pluralities of probabilities that the communication symbol has respective ones of a plurality of possible values of the communication symbol;
    a first SISO decoder for receiving said first plurality of probabilities and producing therefrom a further first plurality of probabilities, an output of said first decoder coupled to an input of said probability generator;
    a second SISO decoder for receiving said second plurality of probabilities and producing therefrom a further second plurality of probabilities, an output of said second decoder coupled to an input of said probability generator;
    a de-interleaver coupling an output of said first SISO decoder to an input of said second SISO decoder; and
    an interleaver coupling an output of said second SISO decoder to an input of said first SISO decoder.

2. The apparatus of claim 1, wherein said probability generator further comprises an estimator coupled to receive said composite communication symbol.

3. The apparatus of claim 2, wherein said estimator provides estimates of fading parameters fading parameters in said composite communication symbol.

4. The apparatus of claim 1, wherein said probability generator further comprises a calculation apparatus coupled to receive said composite communication symbol.

5. The apparatus of claim 4, wherein said calculation apparatus calculates probability values using the estimated fading parameters.

6. The apparatus of claim 2, wherein said probability generator further comprises a calculation apparatus coupled to receive said composite communication symbol.

7. The apparatus of claim 6, further including at least one input of said calculation apparatus being coupled to receive estimated fading parameters from said estimator.

8. The apparatus of claim 6, wherein said calculation apparatus calculates probability values using the estimated fading parameters.

9. The apparatus of claim 6, further including first and second combiners coupled to said calculation apparatus.

10. The apparatus of claim 9, further including an output of said first combiner coupled to an input of said first SISO decoder and an output of said second combiner coupled to an input of said second SISO decoder.

11. The apparatus of claim 9, further including an input of said first combiner coupled to an output of said second SISO decoder and an input of said second combiner coupled to an output of said first SISO decoder.

12. The apparatus of claim 1, further including:
a second de-interleaver coupling an output of said probability generator to an input of said second SISO decoder;
a second interleaver coupling said output of said second decoder coupled to said input of said probability generator;
a third de-interleaver coupling an output of said probability generator to an input of said first SISO decoder;
a third interleaver coupling said output of said first decoder to said input of said probability generator.

13. The apparatus of claim 1, wherein said first plurality of combined probabilities is received at an a priori output probability terminal of said first SISO decoder.

14. The apparatus of claim 13, wherein said further plurality of combined probabilities is a plurality of combined a posteriori output probabilities produced by said first SISO decoder.

15. The apparatus of claim 1, wherein said second plurality of combined probabilities is received at an a priori output probability terminal of said second SISO decoder.

16. The apparatus of claim 15, wherein said further plurality of combined probabilities is a plurality of combined a posteriori output probabilities produced by said second SISO decoder.

17. A wireless communication transmitter apparatus, comprising:
an input for receiving a bit stream;
a first coder coupled to said input for performing a coding operation on said bit stream, said coder having an output for providing a result of said coding operation;
a first interleaver coupled to said input, for interleaving said bit stream;
a second coder, coupled to an output of said first interleaver, for performing a coding operation on said interleaved bit stream, said coder having an output for providing a result of said coding operation;
a second interleaver coupled to said first coder;
a third interleaver coupled to said second coder;
a first modulator coupled to an output of said second interleaver for modulating said result, and a first antenna coupled to said first modulator for transmitting said modulated result of said first coder operation on a wireless communication channel; and
a second modulator coupled to an output of said third interleaver for modulating said result, and a second antenna coupled to said second modulator for transmitting said modulated result of said second coder operation on a wireless communication channel.

18. The apparatus of claim 17, wherein at least one of said first and second coders is a convolutional coder.

19. The apparatus of claim 17, wherein one of said first and second modulators is a QPSK modulator.

20. A method of wireless communication, comprising:
receiving a bit stream;
performing a coding operation on said bit stream and outputting a result of said coding operation;
interleaving said result of said coding operation;
modulating said interleaved result with a first modulator and transmitting said modulated result on a first antenna;
interleaving said bit stream;
performing a coding operation on said interleaved bit stream and outputting a result of said coding operation on said interleaved bit stream;
interleaving said result of said coding operation on said interleaved bit stream; and
modulating said interleaved result of said coding operation on said interleaved bit stream with a second modulator and transmitting said modulated result on a second antenna.

21. A method of wireless communication, comprising:
receiving via first and second wireless communication channels a composite communication symbol that represents first and second communication symbols which each correspond to a result of a coding operation performed by a transmitter apparatus on a bit stream;
generating, for said first and second communication symbols, corresponding first and second pluralities of probabilities that the communication symbol has respective ones of a plurality of possible values of the communication symbol;
producing, from said first plurality of probabilities, a further first plurality of probabilities, an output of said first decoder coupled to an input of said probability generator; and
producing, from said second plurality of probabilities, a further second plurality of probabilities, an output of said second decoder coupled to an input of said probability generator.

22. The method of claim 21, wherein at least a portion of the results of said step of producing, from said first plurality of probabilities, a further first plurality of probabilities, are output to be used in said generating step.

23. The method of claim 21, wherein at least a portion of the results of said step of producing, from said second plurality of probabilities, a further second plurality of probabilities, are output to be used in said generating step.

* * * * *